Nov. 21, 1961    J. KALMAN ET AL    3,009,198
APPARATUS FOR MAKING AND TRIMMING HOLLOW PLASTIC ARTICLES
Filed Dec. 29, 1959    3 Sheets-Sheet 1

Inventors
JOHN KALMAN
ALEXANDER KENNAWAY
By
Attorneys

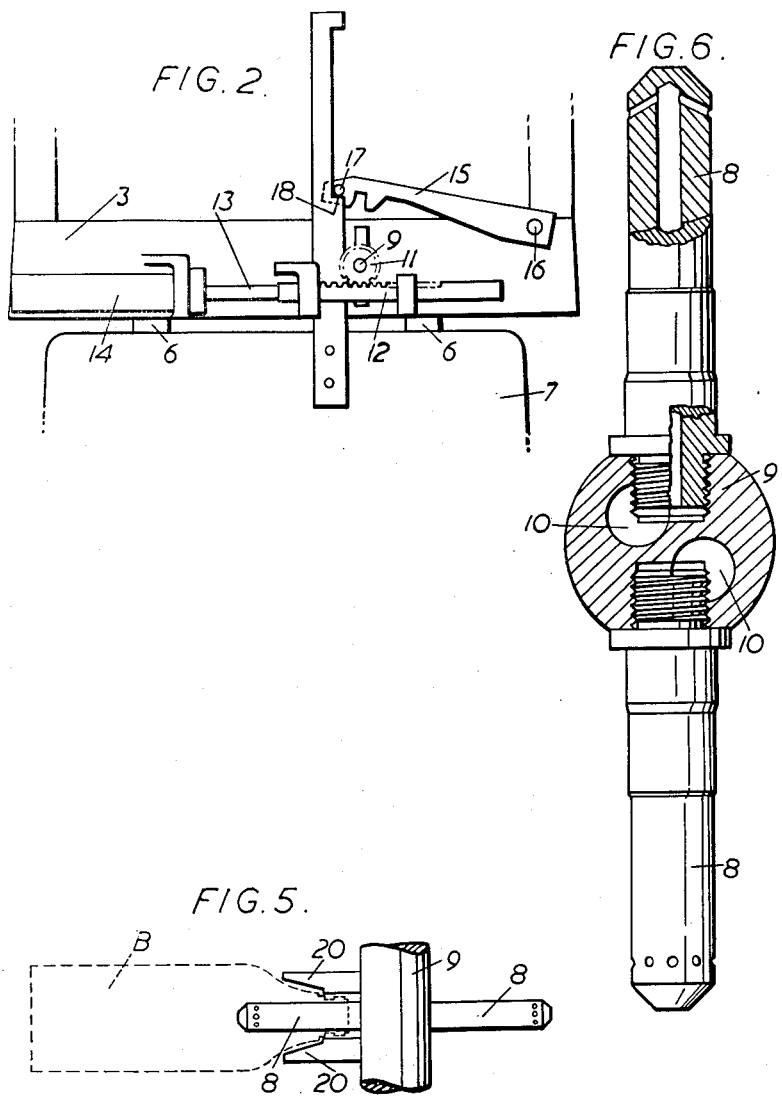

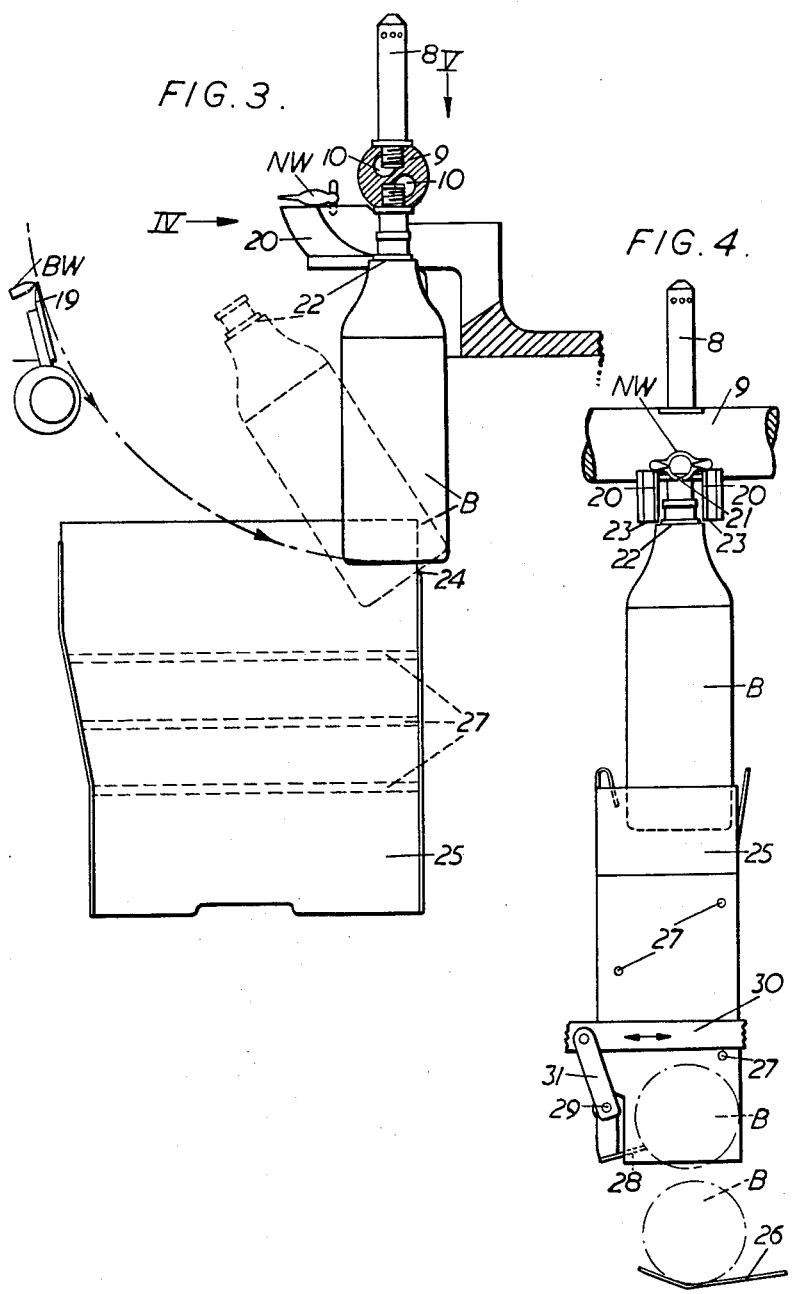

United States Patent Office 3,009,198
Patented Nov. 21, 1961

3,009,198
APPARATUS FOR MAKING AND TRIMMING HOLLOW PLASTIC ARTICLES
John Kalman, Hemel Hempstead, and Alexander Kennaway, Golders Green, London, England, assignors to The Metal Box Company Limited, London, England, a company of Great Britain
Filed Dec. 29, 1959, Ser. No. 862,559
Claims priority, application Great Britain Jan. 12, 1959
9 Claims. (Cl. 18—5)

This invention relates to the manufacture of hollow articles, such as bottles, from thermoplastic materials such as polyethylene, cellulose esters, polyvinyl chloride, or polystyrene, hereinafter referred to as "plastic materials."

In one currently employed method of manufacturing bottles from plastic materials a length of plastic tube is extruded from the extrusion nozzle of a plastic extrusion machine and when the leading end of the extruded tube has been disposed about a hollow mandrel, about which the neck of the bottle is shaped, a sectional mould is closed about the extruded tube and the mandrel, the tube is severed from the parent tube and fluid, usually air, under pressure is admitted through the mandrel to blow the enclosed tube length to the shape of the interior of the closed mould. After cooling the mould is opened and the bottle is stripped from the mandrel either by blowing into the bottle through the mandrel or by moving the mandrel axially thereof relative to the mould to withdraw the mandrel from the bottle neck.

It has also been proposed to rotate the mandrel between a vertical position thereof for co-operation with the mould and a position at which it is inclined by less than a right-angle to the vertical so that a bottle moved thereby out of the mould can be blown off the mandrel.

When the bottles are stripped from the mandrel in any of the ways previously proposed they are delivered indiscriminately to a box or the like from which they are removed manually one at a time for removal of the waste material adhering thereto and thereafter they are conveyed manually to the first stage of a finishing process which usually consists of subjecting the bottles to treatment preparatory to printing thereon and to the subsequent printing operations.

It is one object of the present invention to provide that manual handling of the bottles is reduced by effecting removal of the waste material from the bottles before they are removed from the mandrel.

A further object of the invention is to provide that the bottles can be so moved out of the mould by the mandrel that they are positioned by the mandrel in a manner such that, if desired, the bottles can be removed from the mandrel and delivered on to a conveyor arranged to convey the bottles in succession to the first stage of a finishing process.

According to the invention there is provided apparatus for use in forming hollow articles of plastic material, including a sectional mould operable to enclose a tube of softened plastic material, a hollow mandrel locatable in one end of the tube to permit fluid under pressure to be admitted to the tube to expand the tube to the internal shape of the mould and between which and one end of the mould said one end of the tube is clamped, a support for the mandrel, said support being movable between the position at which the mandrel co-operates with the mould and a discharge position at which an article removed from the mould by the mandrel is ejected from the mandrel, and stationary stripper elements interposed in the path of waste material extending from the article and operable by engagement therewith to remove said waste from the article during movement of the mandrel from the mould to the discharge position.

In order that the invention may be clearly understood some embodiments thereof will now be described, by way of example, with reference to the accompanying diagrammatic drawings, in which:

FIGURE 1 diagrammatically illustrates apparatus according to the invention,

FIGURE 2 illustrates mechanism for effecting rotation of a mandrel,

FIGURE 3 illustrates the manner in which waste material is stripped from a bottle and in which a bottle is turned sideways for depositing on a conveyor, FIGURE 4 is a view looking in the direction of arrow IV, FIGURE 3, FIGURE 5 is a view looking in the direction of arrow V, FIGURE 3, and FIGURE 6 illustrates, partly in section, a mandrel as used in the apparatus.

Figure 1:
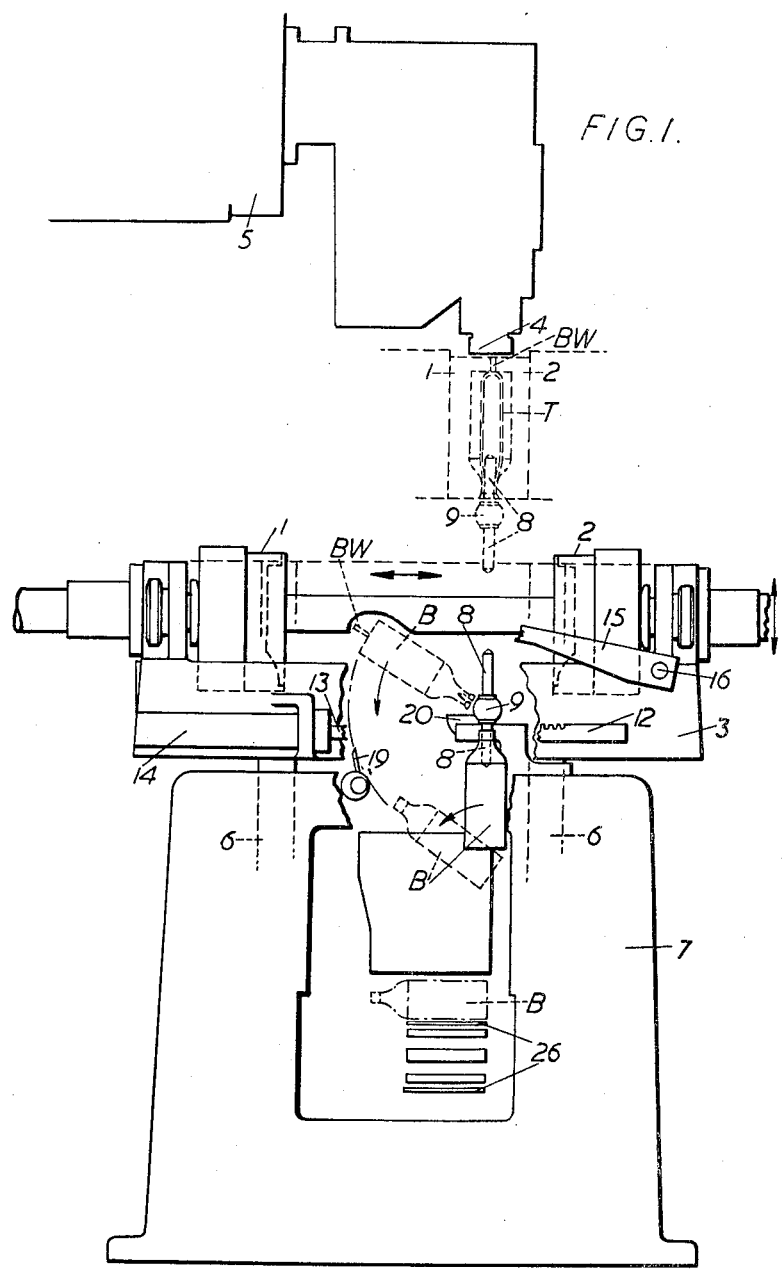

Referring to the drawings, a sectional mould consisting of two halves 1, 2, FIGURE 1, are supported by a mould-carrying table 3 for movement towards and away from each other, in known manner not shown, to effect opening and closing of the mould. The mould is arranged to be located beneath the extrusion nozzle 4 of a plastic extrusion machine 5, the nozzle 4, in known manner, being arranged to effect the continuous extrusion of a plastic tube T indicated in dotted lines in FIGURE 1. The table 3 is carried by rods 6 which are supported for axial reciprocation in a base frame 7, reciprocation of the rods and table being effected in known manner by mechanism not shown so that the mould is movable from the full-line position thereof in FIGURE 1 to the dotted line position thereof. When in the full-line or down position the mould is open so that a bottle which has been formed therein can be removed therefrom. At the appropriate time in the operating cycle the table, with the mould still open, and the hollow mandrel 8 located relative thereto, is raised to the dotted line position at which the mandrel is located in the leading end of a length of tube depending from the extrusion nozzle 4. The mould halves are then closed so that a length of tube of softened plastic material is enclosed therein, the upper end of the tube being clamped between the upper edge portions of the mould while the lower end portion of the tube is clamped about the mandrel by the lower edge portions of the mould. Just before the closed mould descends to the down position thereof a knife, not shown, operates to sever the upper end of the tube from the parent tube and air under pressure is admitted to the interior of the tube through the hollow mandrel. The air causes the tube to be expanded to conform it to the shape of the interior of the mould and after an interval, during which the formed bottle is cooled and set, the mould is opened to permit the bottle to be removed from the mould and from the mandrel.

In accordance with the present invention, the mandrel 8 extends radially from a rotatable support 9 which is provided with a longitudinally extending passage 10, FIGURE 6, to communicate with the interior of the hollow mandrel and with a source, not shown, of air under pressure. In the preferred embodiment of the invention, as illustrated in the drawings, the support 9 carries two axially aligned hollow mandrels 8, each communicating with a passage 10, so that one mandrel can be located for co-operation with the mould while the other can be positioned to facilitate the removal of a formed bottle therefrom as will be described below.

The support 9 is carried by bearings, not shown, mounted on the table 3 and operating means for effecting rotation of the support 9 comprises a pinion 11, FIGURE 2, co-axial and rotatable with the support, a toothed rack 12 meshing with the pinion, and an actuating device arranged to effect movement of the rack 12 thereby to rotate pinion 11. The actuating device comprises a fluid-operated axially movable rod 13 connected to the rack 12. Rod 13 is connected to a piston, not shown, housed in a cylinder 14 and the fluid pressure for operating the rod may be air or liquid. Operation of the rod is effected in timed relation with the movements of table 3 by any suitable means, not shown, so that rotation of the support 9 is effected only after the mould has returned to the down position thereof and has been opened. On rotation thereof by rod 13, the support 9 rotates each of the mandrels 8 through 180° so that, as illustrated in FIGURES 1 and 3, the mandrel about which a bottle neck is formed is moved to a discharge position at which the bottle can be removed therefrom and the other of the mandrels is located for cooperation with the mould during the next succeeding bottle-forming operation.

When the table 3 is raised from the down position thereof a latch 15, FIGURE 2, pivoted at 16 to the table is caused, by gravity or by a spring not shown, to engage with opposed flat portions, not shown, formed on the support 9 and so restrain the support against inadvertent rotation. As the table again approaches the down position thereof an abutment 17 extending laterally from latch 15 is engaged with a fixed abutment 18 thus causing the latch to release support 9 for rotation by rod 13.

As is well understood, when a bottle B is formed as described above there is a portion of waste material BW extending diametrically across the bottom of the bottle B and a further portion NW is attached to the neck of the bottle. These portions of waste material are removed from the bottle while it is moved with the mandrel 8, about which the neck of the bottle is formed, from the upside down to the upright positions thereof as illustrated in FIGURES 1 and 3. Removal of the waste material is effected by stripper knives 19, 20 which are supported by the base frame 7 to be stationary in space. The knives 19, 20 are so constructed and interposed in the path of the waste portions that as the bottle is moved past them they respectively operate to shear from the bottle the waste portions BW and NW. To facilitate removal of the waste portion NW this has a V-notch 21, FIGURE 4, moulded therein to weaken the circular portion of the waste material so that this portion splits when engaged by the stripper knives 20.

From the foregoing it will be understood that the waste material BW and NW is removed from the bottle before rotation of the mandrel is completed and the bottle is supported by the mandrel in the upright position of the bottle illustrated in FIGURES 1 and 3. When in this upright position thereof, a shoulder 22 of the bottle is located between and beneath the stripper knives 20, see FIGURE 4, so that as the table 3 is raised the shoulder 22 is engaged by the undersides 23, FIGURE 4, of knives 20 and the mandrel is withdrawn from the bottle.

On withdrawal of the mandrel from the bottle the latter falls vertically downwards until the bottle bottom engages means interposed in the path thereof and arranged to effect turning of the bottle so that it continues its fall in a sideways manner. As illustrated in the drawings, the bottle-turning means consists of the upper edge 24, FIGURE 3, of a vertical chute 25 through which the bottle falls sideways towards a pocket-type conveyor 26 the pockets of which are arranged to receive successive bottles delivered from the chute and to convey them sideways in spaced relation to the first stage of a bottle-finishing process which may include printing on the bottle and a pre-treating stage at which the bottle surface is prepared for printing. Baffle elements in the form of rods 27 are located in the chute to maintain the bottles in the sideways lying positions thereof during their movement through the chute to the conveyor.

To ensure that a bottle is delivered from the chute only when a conveyor pocket is located to receive it the bottle is arrested adjacent the bottom of the chute by a catch 28, FIGURE 4, pivoted at 29 and operable by a bar 30 and link 31. The bar 30 is caused by suitable means, not shown, to rock catch 29 out of engagement with a bottle only when a conveyor pocket is positioned to receive the bottle as it falls from the chute.

It will be understood that if it is desired that the bottles stand upright on the conveyor the chute will be omitted and the conveyor so arranged relative to the bottom of a bottle being removed from a mandrel that the bottle falls a minimum distance. If desired guides may be provided to ensure the vertical fall of the bottle on to the conveyor.

In a modified embodiment of the invention a bottle may be removed from a mandrel after rotation thereof through 90° from the position of co-operation thereof with the mould. In such case the bottle may be removed axially from the mandrel by a reciprocable stripper which engages a shoulder on the bottle and moves the bottle axially on to a conveyor.

As described above bottles have been considered as being produced one at a time. It is, however, to be understood that the extruding machine may be of the kind provided with a plurality of side-by-side extruding nozzles each of which co-operates with a sectional mould and associated elements as herein described. In such a machine the conveyor is common to all moulds and mandrels so that it conveys the whole of the output of the machine to the first stage of the finishing process.

We claim:

1. Apparatus for use in forming hollow articles of plastic material, including a sectional mould operable to enclose a tube of softened plastic material, a hollow mandrel locatable in one end of the tube to permit fluid under pressure to be admitted to the tube to expand the tube to the internal shape of the mould and between which and one end of the mould said one end of the tube is clamped, a support for the mandrel, said support being movable between the position at which the mandrel co-operates with the mould and a discharge position at which an article removed from the mould by the mandrel is ejected from the mandrel, and stationary stripper elements interposed in the path of waste material extending from the article and operable by engagement therewith to remove said waste from the article during movement of the mandrel from the mould to the discharge position.

2. Apparatus for use in forming hollow articles of plastic material, including a sectional mould operable to enclose a tube of softened plastic material, a hollow mandrel locatable in one end of the tube to permit fluid under pressure to be admitted to the tube to expand the tube to the internal shape of the mould and between which and one end of the mould said one end of the tube is clamped, a support rotatable about the axis thereof and adapted to effect communication between the interior of the mandrel and a source of fluid under pressure, a pinion co-axial and rotatable with the support, a toothed rack meshing with the pinion, an actuating device operable to effect movement of the rack thereby to rotate the support and mandrel between the position at which the mandrel co-operates with the mould and a discharge position at which an article removed from the mould by the mandrel is ejected from the mandrel, and stationary stripper elements interposed in the path of waste material extending from the article and operable by engagement therewith to remove said waste from the article during movement of the mandrel from the mould to the discharge position.

3. Apparatus according to claim 2, wherein the actuating device comprises a fluid-operated axially movable rod connected to the rack.

4. Apparatus for use in forming hollow articles of plastic material, including a sectional mould operable to enclose a tube of softened plastic material, a hollow mandrel locatable in one end of the tube to permit fluid under pressure to be admitted to the tube to expand the tube to the internal shape of the mould and between which and one end of the mould said one end of the tube is clamped, a support rotatable about the axis thereof and adapted to effect communication between the interior of the mandrel and a source of fluid under pressure, a pinion co-axial and rotatable with the support, a toothed rack meshing with the pinion, an actuating device operable to effect movement of the rack thereby to rotate the support and mandrel between the position at which the mandrel co-operates with the mould and a discharge position at which an article removed from the mould by the mandrel is ejected from the mandrel, a latch engageable with the support to retain the mandrel in the position of co-operation thereof with the mould, trip means to release the latch from the support preparatory to rotation thereof by the rack to the discharge position, and stationary stripper elements interposed in the path of waste material extending from the article and operable by engagement therewith to remove said waste from the article during movement of the mandrel from the mould to the discharge position.

5. Apparatus for use in forming bottles of plastic material, including a sectional mould operable to enclose a tube of softened plastic material, a hollow mandrel locatable in one end of the tube to permit fluid under pressure to be admitted to the tube to expand the tube to the internal shape of the mould and between which and one end of the mould said one end of the tube is clamped, a support for the mandrel, said support being movable between the position at which the mandrel co-operates with the mould and a discharge position at which a bottle removed from the mould by the mandrel is ejected from the mandrel in which the bottle is in an upright position, stationary stripper elements interposed in the path of waste formed on the neck and bottom of the bottle and operable by engagement therewith to remove said waste from the bottle as the bottle is moved by the mandrel past the stationary stripper elements, and a stationary ejector engageable with the bottle as the mandrel approaches the discharge position and operable to push the bottle off the mandrel.

6. Apparatus for use in forming bottles of plastic material, including a sectional mould operable to enclose a tube of softened plastic material, a hollow mandrel locatable in one end of the tube to permit fluid under pressure to be admitted to the tube to expand the tube to the internal shape of the mould and between which and one end of the mould said one end of the tube is clamped, a support for the mandrel, said support being movable between the position at which the mandrel co-operates with the mould and a discharge position at which a bottle removed from the mould by the mandrel is ejected from the mandrel in which the bottle is in an upright position, stationary stripper elements interposed in the path of waste formed on the neck and bottom of the bottle and operable by engagement therewith to remove said waste from the bottle as the bottle is moved by the mandrel past the stationary stripper elements, a stationary ejector engageable with the bottle as the mandrel approaches the discharge position and operable to push the bottle off the mandrel, a chute disposed below said stationary ejector to receive the bottle discharged from the mandrel, and baffle elements located in the chute and operable to rotate the bottle so that the bottle leaves the chute with its axis located substantially in a horizontal plane.

7. Apparatus for use in forming bottles of plastic material, including at least one hollow mandrel movable with a rotatable support therefor between a sectional mould in which one end of a tube of softened plastic material is located around the mandrel and is clamped between the mandrel and one end of the closed mould during expansion of the tube to conform it to the shape of the interior of the mould and a discharge position at which a bottle removed from the mould by the mandrel is ejected from the mandrel, said support being adapted to effect communication between the interior of the mandrel and a source of fluid under pressure, and stationary stripper elements located between the mould and the discharge position and interposed in the path of waste formed on the neck and bottom of the bottle and operable by engagement therewith to remove the waste from the bottle as the bottle is moved by the mandrel from the mould to the discharge position.

8. Apparatus for use in forming bottles of plastic material comprising the combination with a sectional mould in which a tube of softened plastic material is expanded to the shape of the interior of the mould by fluid under pressure introduced into the tube, of at least one hollow mandrel carried by a support rotatable in timed relation with the opening and closing of the mould to move the mandrel between a position at which the mould is closed around the mandrel to clamp one end of the tube between the mandrel and an end of the mould with the mandrel inserted into said one end of the tube and a discharge position at which a bottle removed from the mould by the mandrel is ejected from the mandrel in a substantially upright position, stationary stripper elements located between the mould and the discharge position and interposed in the path of waste formed on the neck and bottom of the bottle and operable by engagement therewith to remove the waste from the bottle as the bottle is moved by the mandrel to the discharge position, and a bottle-turning device located beneath the discharge position and operable to rotate the discharged bottle so that the bottle leaves the device with its axis located in a substantially horizontal plane.

9. Apparatus for use in forming bottles of plastic material comprising the combination with a sectional mould in which a tube of softened plastic material is expanded to the shape of the interior of the mould by fluid under pressure introduced into the tube, of at least one hollow mandrel carried by a support rotatable in timed relation with the opening and closing of the mould to move the mandrel between a position at which the mould is closed around the mandrel to clamp one end of the tube between the mandrel and an end of the mould with the mandrel inserted into said one end of the tube and a discharge position at which a bottle removed from the mould by the mandrel is ejected from the mandrel in a substantially upright position, a stationary bottom-waste stripper element located between the mould and the discharge position, and a combined stationary neck-waste stripper and bottle ejector element located between the mould and the discharge position, said bottom-waste stripper element and combined neck-waste stripper and ejector element being operable respectively during movement of the mandrel from co-operation with the mould to the discharge position to engage and remove bottom-waste from the bottle and to engage and remove neck-waste from the bottle and to engage and remove the bottle from the mandrel.

References Cited in the file of this patent
UNITED STATES PATENTS

| | | |
|---|---|---|
| 1,801,085 | Humphrey | Apr. 14, 1931 |
| 2,569,083 | Wilhem | Sept. 25, 1951 |
| 2,579,951 | Morin et al. | Dec. 25, 1951 |
| 2,810,934 | Bailey | Oct. 29, 1957 |
| 2,853,736 | Gussoni | Sept. 30, 1958 |
| 2,903,740 | Parfrey | Sept. 15, 1959 |